United States Patent
Liensberger

(10) Patent No.: US 9,218,333 B2
(45) Date of Patent: Dec. 22, 2015

(54) CONTEXT SENSITIVE AUTO-CORRECTION

(75) Inventor: Christian Liensberger, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 306 days.

(21) Appl. No.: 13/601,712

(22) Filed: Aug. 31, 2012

(65) Prior Publication Data

US 2014/0067371 A1    Mar. 6, 2014

(51) Int. Cl.
| | |
|---|---|
| *G06F 17/20* | (2006.01) |
| *G06F 17/28* | (2006.01) |
| *G06F 17/27* | (2006.01) |
| *G06F 17/21* | (2006.01) |
| *G10L 21/00* | (2013.01) |
| *G10L 25/00* | (2013.01) |
| *G06F 3/023* | (2006.01) |
| *H04M 1/725* | (2006.01) |

(52) U.S. Cl.
CPC ........... *G06F 17/273* (2013.01); *G06F 3/0237* (2013.01); *G06F 17/2735* (2013.01); *G06F 17/275* (2013.01); *G06F 17/276* (2013.01); *H04M 1/72552* (2013.01); *H04M 1/72566* (2013.01); *H04M 1/72572* (2013.01); *H04M 2250/70* (2013.01)

(58) Field of Classification Search
USPC ........................................................ 704/1–10
See application file for complete search history.

(56) References Cited

U.S. PATENT DOCUMENTS

| | | | | |
|---|---|---|---|---|
| 6,047,300 | A  * | 4/2000 | Walfish et al. | 715/257 |
| 6,618,697 | B1 * | 9/2003 | Kantrowitz et al. | 703/22 |
| 6,918,086 | B2 * | 7/2005 | Rogson | 715/257 |
| 7,681,126 | B2   | 3/2010 | Roose | |
| 7,836,002 | B2 * | 11/2010 | Macbeth et al. | 706/46 |
| 8,091,023 | B2 * | 1/2012 | White et al. | 715/257 |
| 8,112,708 | B2   | 2/2012 | Griffin et al. | |
| 8,830,182 | B1 * | 9/2014 | Alakuijala | 345/173 |
| 8,903,719 | B1 * | 12/2014 | Landry et al. | 704/10 |
| 2001/0049738 | A1 * | 12/2001 | Doi | 709/228 |

(Continued)

FOREIGN PATENT DOCUMENTS

| | | |
|---|---|---|
| WO | 2004/010323 A2 | 1/2004 |
| WO | 2009/029865 A1 | 3/2009 |
| WO | 2011/113057 A1 | 9/2011 |

OTHER PUBLICATIONS

International Search Report & Written Opinion for PCT Application No. PCT/US2013/056071, Mailed Date: Jan. 29, 2014, Filed Date: Aug. 22, 2013, 11 pages.

(Continued)

*Primary Examiner* — Olujimi Adesanya
(74) *Attorney, Agent, or Firm* — Nicholas Chen; Kate Drakos; Micky Minhas

(57) ABSTRACT

Methods, systems, and computer program products are provided for adaptively autocorrecting text according to context. Text may be received at a mobile electronic device that was input by a user. The received text may be displayed at a display component of the mobile electronic device. An auto-correct dictionary is selected from a plurality of auto-correct dictionaries. The auto-correct dictionary may be selected based at least on usage information that is representative of a usage context of the mobile electronic device. The displayed text is auto-corrected according to the selected auto-correct dictionary.

20 Claims, 5 Drawing Sheets

(56) References Cited

U.S. PATENT DOCUMENTS

| | | | |
|---|---|---|---|
| 2005/0108017 A1* | 5/2005 | Esser et al. | 704/277 |
| 2005/0234722 A1* | 10/2005 | Robinson et al. | 704/257 |
| 2006/0025091 A1* | 2/2006 | Buford | 455/154.2 |
| 2006/0230350 A1 | 10/2006 | Baluja | |
| 2006/0242191 A1 | 10/2006 | Kutsumi et al. | |
| 2007/0033002 A1* | 2/2007 | Dymetman et al. | 704/5 |
| 2007/0299949 A1* | 12/2007 | Macbeth et al. | 709/223 |
| 2008/0126075 A1 | 5/2008 | Thorn | |
| 2009/0083028 A1* | 3/2009 | Davtchev et al. | 704/9 |
| 2009/0307584 A1 | 12/2009 | Davidson et al. | |
| 2009/0319258 A1 | 12/2009 | Shaer | |
| 2010/0005061 A1* | 1/2010 | Basco et al. | 707/3 |
| 2010/0050074 A1* | 2/2010 | Nachmani et al. | 715/257 |
| 2010/0100371 A1* | 4/2010 | Yuezhong et al. | 704/9 |
| 2010/0131447 A1* | 5/2010 | Creutz et al. | 706/52 |
| 2010/0131900 A1* | 5/2010 | Spetalnick | 715/825 |
| 2010/0161733 A1* | 6/2010 | Bower et al. | 709/206 |
| 2010/0169770 A1* | 7/2010 | Hong et al. | 715/261 |
| 2010/0180198 A1* | 7/2010 | Iakobashvili et al. | 715/257 |
| 2010/0325539 A1* | 12/2010 | Nedzlek et al. | 715/257 |
| 2011/0010174 A1* | 1/2011 | Longe et al. | 704/235 |
| 2011/0047149 A1* | 2/2011 | Vaananen | 707/723 |
| 2011/0201387 A1* | 8/2011 | Paek et al. | 455/566 |
| 2011/0202876 A1* | 8/2011 | Badger et al. | 715/816 |
| 2011/0294525 A1* | 12/2011 | Jonsson | 455/466 |
| 2012/0022852 A1* | 1/2012 | Tregaskis et al. | 704/3 |
| 2012/0035924 A1* | 2/2012 | Jitkoff et al. | 704/235 |
| 2012/0035931 A1* | 2/2012 | LeBeau et al. | 704/251 |
| 2012/0035932 A1* | 2/2012 | Jitkoff et al. | 704/254 |
| 2013/0046544 A1* | 2/2013 | Kay et al. | 704/275 |
| 2013/0211821 A1* | 8/2013 | Tseng et al. | 704/9 |
| 2014/0035823 A1* | 2/2014 | Khoe et al. | 345/171 |

OTHER PUBLICATIONS

Huang, et al., "Large Scale Experiments on Correction of Confused Words", Retrieved at <<http://ieeexplore.ieee.org/stamp/stamp.jsp?tp=&arnumber=906626>>, 24th Australasian Computer Science Conference: ACSC 2001, Feb. 2, 2001, pp. 77-82.

"Troubleshoot multilingual text", Retrieved at <<http://office.microsoft.com/en-gb/word-help/troubleshoot-multilingual-text-HP005258568.aspx>>, Jun. 23, 2010, 2 pages.

Reynaert, "Multilingual Text Induced Spelling Correction", Retrieved at <<http://delivery.acm.org/10.1145/1710000/1706256/p117-reynaert.pdf?ip=203.8.109.15&acc=OPEN &CFID=87427131&CFTOKEN=38086232&__acm__=1330505289_c5967604ddd28f6d00a39024d5e1edf3>>, Proceedings of the Workshop on Multilingual Linguistic Resources, Aug. 28, 2004, 8 pages.

"Top tips for the iPhone keyboard", Retrieved at <<http://www.geekgirls.com/2011/04/iphone-keyboard-tips/>>, Apr. 2, 2011, 4 pages.

* cited by examiner 302
automatically select an auto-correct dictionary from a plurality of
auto-correct dictionaries based at least on an identity of the user 502
automatically select an auto-correct dictionary from a plurality of auto-correct dictionaries based at least on a location of the mobile electronic device
FIG. 5
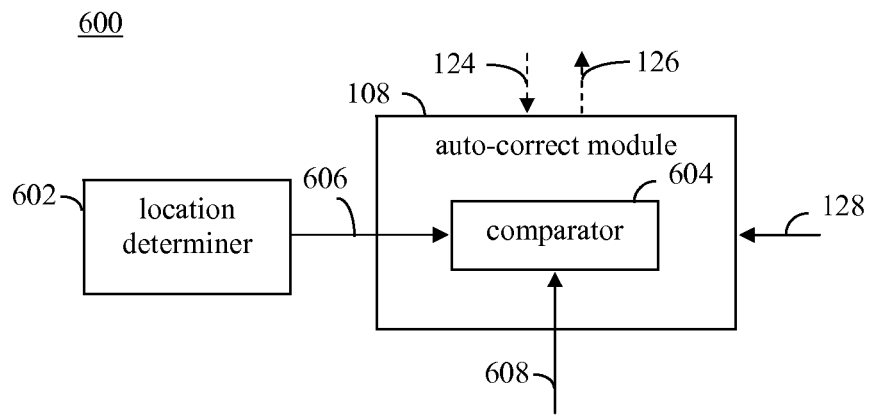
FIG. 6
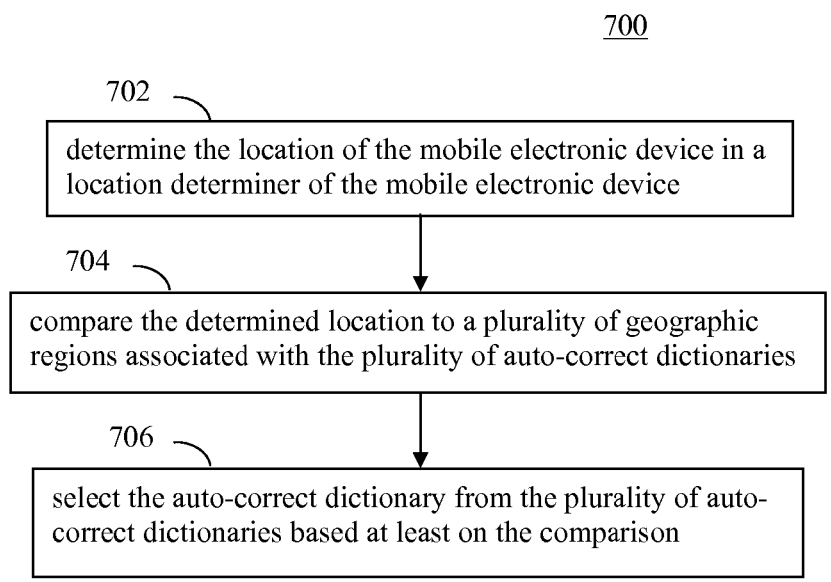
FIG. 7

CONTEXT SENSITIVE AUTO-CORRECTION

BACKGROUND

Autocorrection is a function that is implemented in some text handling tools to automatically correct spelling and/or typing errors in text. Autocorrection may also be used to automatically format text or insert special characters by recognizing particular character usage, saving the user from having to manually perform the formatting/character inserting. Tools on mobile devices that are used to send text messages (e.g., Short Message Service (SMS) messages, etc.) may implement autocorrection, as well as other types of messaging tools. Autocorrection may also be referred to as "autocorrect," "replace as you type," and "text replacement," among other names.

Current autocorrection tools are configured to autocorrect text for a particular language. However, devices are used that may receive text in more than one language. In such a circumstance, an autocorrection tool that may not work properly. For instance, a Spanish speaking user may type in the word "yo," which in Spanish means "I". However, if the autocorrection tool is configured for the English language, the autocorrection tool may undesirably autocorrect the word "yo" to the word "you" or to other English word. Such undesired autocorrections of text may be inconvenient to a user. If the user notices that a word was autocorrected that should not have been, the user may manually convert the text back to its original, uncorrected form. However, if the user does not notice the undesired autocorrection, the meaning of the text that the user was providing may undesirably be changed, or the text may even become unintelligible.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for adaptively autocorrecting text according to context. According to a method implementation, text may be received at a mobile electronic device that was input by a user. The received text may be displayed by a display component of the mobile electronic device. An auto-correct dictionary is selected from a plurality of auto-correct dictionaries. The auto-correct dictionary may be selected based at least on usage information representative of a usage context of the mobile electronic device. The displayed text is auto-corrected according to the selected auto-correct dictionary.

When subsequent text is received at the mobile electronic device, the subsequent text may be autocorrected based on the same selected auto-correct dictionary, or based on a different auto-correct dictionary that may be selected, depending on the usage context at the time the subsequent text is received. For instance, with regard to the subsequent text, the user inputting the text may have changed, a location of the mobile electronic device may have changed, as well as the time at which subsequent text is received being different. The same or a different auto-correct dictionary may be selected to perform autocorrection of the subsequent text based on any one or more of these changes in context, as well as any other changes in context.

According to a system or apparatus implementation, a mobile electronic device includes a display component, a text input module, and an auto-correct module. The display component is capable of at least displaying textual characters. The text input module receives text provided by a user to the mobile electronic device, and provides the received text to the display component for display in a user interface. The auto-correct module automatically corrects the displayed text according to a selected auto-correct dictionary. The auto-correct module automatically selects the selected auto-correct dictionary from a plurality of auto-correct dictionaries based at least on usage information representative of a usage context of the mobile electronic device.

Computer program products containing computer readable storage media are also described herein that store computer code/instructions for enabling autocorrection functionality to be adaptive according to usage context, as well as enabling additional embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 5 shows a process for selecting an auto-correct dictionary for autocorrecting text based on a location of a mobile device, according to an example embodiment.

FIG. 6 shows a block diagram of a system that autocorrects text based on location, according to an example embodiment.

FIG. 7 shows a flowchart providing a process for selecting an auto-correct dictionary for autocorrecting text based on location, according to an example embodiment.

Figure 1:
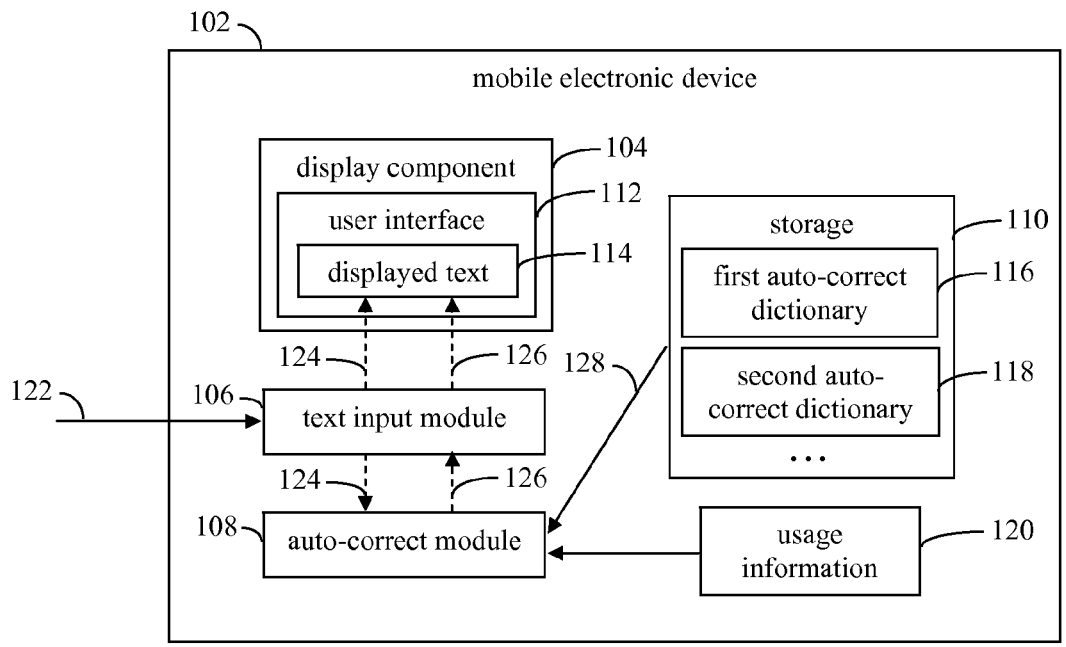
FIG. 1 shows a block diagram of a mobile electronic device that is configured with adaptive autocorrect functionality, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Autocorrection is a function that is implemented in some text handling tools to automatically correct spelling and/or typing errors in text, and to automatically format text or insert special characters by recognizing particular character usage (e.g., changing abbreviations to full words/phrases, etc.). A variety of text-handling-related tools may be configured to implement autocorrection, including word processing tools such as Microsoft® Word developed by Microsoft Corporation and WordPerfect® developed by Corel Corporation of Ottawa, Ontario, messaging tools (e.g., email tools, text messaging tools, instant messaging tools, etc.), and further types of tools that receive and manipulate text. Examples of email tools that are used to send emails include Microsoft® Outlook® provided by Microsoft Corporation of Redmond, Wash., and Gmail™ provided by Google Inc. of Mountain View, Calif. Examples of text messaging tools include those that are used to send text messages according to Short Message Service (SMS), etc. These examples are provided for illustrative purposes, and are not intended to be limiting.

Tools that perform autocorrection typically are not configured to handle autocorrection for multiple languages, but instead are configured to handle a single language at a time. For instance, a tool may be preconfigured for a particular language, or a user of the tool may manually set the particular language for which the tool is configured. By being limited to handling a single language, an autocorrection tool may not work properly when presented with text in more than one language. For instance, when using a text messaging tool configured with autocorrection, a Spanish speaking user may type in the word "yo," which means "I" in Spanish. However, if the autocorrection tool is configured for the English language, the autocorrection tool may mistake the word "yo" as a typographical error, and autocorrect it to the word "you" or to other word in the English language. Such an undesired autocorrection may be inconvenient to the user, who will have to manually convert the text back to its original, uncorrected form, if the user notices the autocorrection. If the user does not notice the undesired autocorrection, the message may be transmitted by the user to another user with the undesired autocorrection included therein, causing the meaning of the message to be changed and/or become unrecognizable.

Embodiments overcome these deficiencies, enabling autocorrection tools to handle multiple languages, and to automatically switch autocorrect functionality between languages based on context. For instance, in an embodiment, an autocorrection tool may be associated with multiple autocorrect dictionaries corresponding to multiple languages. For example, a first autocorrect dictionary may correspond to English, and include corrections for English language text. A second autocorrect dictionary may correspond to Italian, and include corrections for Italian language text. Further autocorrect dictionaries may be present corresponding to further languages. Furthermore, multiple autocorrect dictionaries may be present for a same language, including autocorrect dictionaries for different dialects of a same language (e.g., a first autocorrect dictionary may correspond to a first dialect of English, another autocorrect dictionary may correspond to a second dialect of English, etc.), autocorrect dictionaries for different subsets of the same language (e.g., different quantities of slang, etc.), etc.

In embodiment, a user may use a mobile device that includes an autocorrect tool (e.g., an autocorrect application or computer program that is executed by one or more processors). Based on a usage context of the mobile device, the autocorrect tool may automatically change between autocorrect dictionaries for a same language (e.g., switching on or off particular autocorrect terms, so that additional words/phrases are autocorrected in the language that were not previously autocorrected, or so one or more words/phrases are no longer autocorrected that were previously autocorrected). Alternatively, based on the usage context of the mobile device, the autocorrect tool may automatically change between autocorrect dictionaries between completely different languages.

In embodiments, various usage context characteristics may be tracked, and used to cause the automatic changing of autocorrect dictionaries. Such usage context characteristics may include one or more of:

(a) A location of the device: For instance, autocorrect functionality may be changed based on the particular country in which the mobile device is located, may be changed based on a geographic boundary (e.g., as may be indicated as a bounding shape on a map), may be changed based on a particular distance from a central location (e.g., 500 feet from downtown Bellevue, etc.), or may be changed based on another location definition.

(b) A time of day: Autocorrect functionality may be changed based on time information, such as a time of day, a day of the week, a particular month, a year, etc. For instance, autocorrect functionality in the morning (e.g., when someone communicates in text with relatives) may be changed relative to autocorrect functionality during a middle portion of the day (e.g., during work hours), etc. In another example, autocorrection functionality may be changed based on a particular day of the month, and particular day or month of the year, (e.g., when someone is abroad visiting family, as compared to visiting a conference abroad), etc.

(c) A user: Autocorrect functionality may be changed based on the particular user who is using a mobile device (e.g., the user that is logged into a notebook computer, etc.). For instance, a user that uses a mobile device may be able to speak one or more languages, and the autocorrect functionality of the mobile device may be configured to change to one of the languages that the user understands.

In embodiments, such adaptive autocorrect functionality may be implemented in a mobile device in various ways. For instance, FIG. 1 shows a block diagram of a mobile electronic device 102 that is configured with adaptive autocorrect functionality, according to an example embodiment. As shown in FIG. 1, mobile electronic device 102 includes a display component 104, a text input module 106, an auto-correct module 108, and storage 110. Mobile electronic device 102 and its features are described as follows.

Mobile electronic device 102 may be any type of mobile computer or computing device such as handheld device (e.g., a Palm® device, a RIM Blackberry® device, a personal digital assistant (PDA)), a laptop computer, a notebook computer, a tablet computer (e.g., an Apple iPad™, a Microsoft Surface™, etc.), a netbook, a mobile phone (e.g., a smart phone such as an Apple iPhone, a Google Android™ phone, a Microsoft Windows® phone, etc.), or other type of mobile device.

Display component 104 is a display of mobile electronic device 102 that is used to display text (textual characters, including alphanumeric characters, arithmetic symbols, etc.) and optionally graphics to users of mobile electronic device 102. For instance, display component 104 may include a display screen that is a portion of or an entirety of a surface of mobile electronic device 102. The display screen may or may not be touch sensitive. Display component 104 may be an LED (light emitting diode)-type display, an LCD (liquid crystal display)-type display, a plasma display, or other type of display that may or may not be backlit.

Text-input module 106 is configured to receive text 122 provided by a user to mobile electronic device 102. User-provided text 122 may include any number of characters, and any number of words. In some SMS embodiments, text 122 may be limited to 160 characters. Mobile electronic device 102 may include one or more user interface elements that may be used to enable the user to provide text 122, such as a keyboard (e.g., the user may type in the text), a thumb wheel, a pointing device, a roller ball, a stick pointer, a touch sensitive display, any number of virtual interface elements (e.g., such as a virtual keyboard or other user interface element displayed in user interface 112 by display component 104), a voice recognition system (e.g., the user may speak the text), and/or other user interface elements described elsewhere herein or otherwise known. In another embodiment, mobile electronic device 102 includes a haptic interface configured to interface mobile electronic device 102 with the user by the sense of touch, by applying forces, vibrations and/or motions to the user. For example, the user of mobile electronic device 102 may wear a glove or other prosthesis to provide the haptic contact.

Text input module 106 may store text 122 (e.g., in memory or other storage, such as in storage 110), and may provide text 122 to display component 104 for display. For instance, as shown FIG. 1, text-input module 106 may transmit the received text to display component 104 as received text 124. Text-input module 106 may provide received text 124 to display component 104 in any form (e.g., as character data, display pixel data, rasterized graphics, etc.). Display component 104 may display received text 124 as displayed text 114 in user interface 112.

In an embodiment, user interface 112 is a graphical user interface (GUI) that includes a display region in which displayed text 114 may be displayed. For instance, user interface 112 may be a graphical window of a word processing tool or a messaging tool in which text may be displayed, and may optionally be generated by text input module 106 for display by display component 104.

In an embodiment, auto-correct module 108 may receive received text 124 from text input module 106. In embodiments, auto-correct module 108 may be included in text input module 106, or may be separate from text input module 106 (as shown in FIG. 1). Auto-correct module 108 is configured to automatically correct received text 124. For instance, in an embodiment, auto-correct module 108 may automatically correct received text according to a selected auto-correct dictionary 128 that is automatically selected from a plurality of auto-correct dictionaries that are stored in storage 110, including a first auto-correct dictionary 116, a second auto-correct dictionary 118, etc. Any number of auto-correct dictionaries 116, 118, etc., may be present. Each auto-correct dictionary is an auto-correct dictionary for a corresponding language, and therefore the plurality of auto-correct dictionaries may include autocorrect dictionaries for different dialects of a same language, for different subsets of a same language, and/or for multiple entirely different languages.

Note that storage 110 may include one or more of any type of storage mechanism, including a magnetic disc (e.g., in a hard disk drive), an optical disc (e.g., in an optical disk drive), a magnetic tape (e.g., in a tape drive), a memory device such as a RAM (random access memory) device, a ROM (read only memory) device, etc., and/or any other suitable type of storage medium.

In an embodiment, auto-correct module 108 is configured to select selected auto-correct dictionary 128 from the plurality of auto-correct dictionaries based on usage information 120. Usage information 120 includes information that is representative of a usage context of mobile electronic device 102 by a user. For instance, usage information 120 may include identity information for the user of mobile electronic device 102 (e.g., an identifier for the user, an identification of one or more languages spoken by the user, etc.), location information for mobile electronic device 102 (e.g., a current location of mobile electronic device 102), time information (e.g., a current date and/or time), and/or further types of usage information.

As shown in FIG. 1, auto-correct module 108 generates corrected text 126, which is a version of received text 124 that has been auto-corrected according to selected auto-correction dictionary 128. For instance, one or more spelling errors may be have been corrected (e.g., changing the characters "netowrk" to "network"), one or more typing errors may have been corrected (e.g., changing the characters "The end." to "The end."), one or more instances of text formatting may have been performed (e.g., changing the characters "omg" to "Oh my God"), one or more special characters (e.g., characters that are not standard alphanumeric characters) may have been inserted (e.g., changing ":)" to a smiley face character "☺"), and/or other forms of auto-correction may have been automatically performed by auto-correct module 108 on received text 124 to generate corrected text 126.

As shown in FIG. 1, text input module 106 receives corrected text 126, and provides corrected text 126 to display component 104 to be displayed as displayed text 114 in user interface 112 in place of received text 124. Text input module 106 may also store corrected text 126 in storage in place of received text 124. It is noted that a user may decide not to accept the autocorrection of received text 124 to corrected text 126, and may interact with user interface 112 to reject the autocorrection, causing received text 124 to again be displayed in user interface 112 (and corrected text 126 is discarded).

Figure 2:
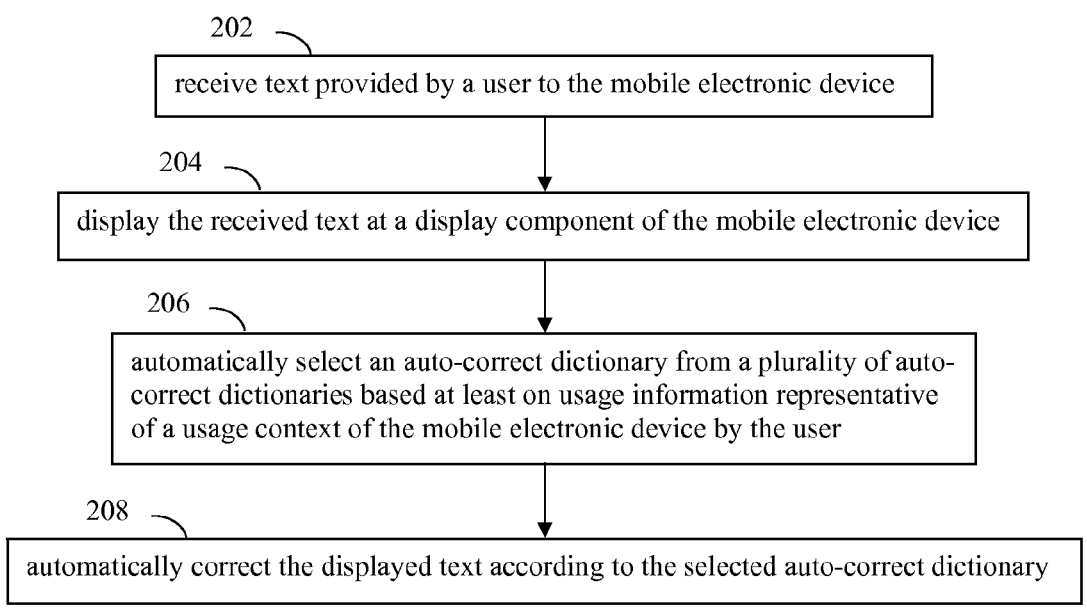
FIG. 2 shows a flowchart providing a process for adaptively autocorrecting text based on a usage context, according to an example embodiment.

FIG. 2 shows a flowchart 200 providing a process for adaptively autocorrecting text based on a usage context, according to an example embodiment. In an embodiment, mobile electronic device 102 may operate according to flowchart 200. Flowchart 200 is described as follows. Further structural and operational embodiments will be apparent to persons skilled in the relevant art(s) based on the following description.

Flowchart 200 begins with step 202. In step 202, text provided by a user to the mobile electronic device is received. For instance, as shown in FIG. 1, text 122 may be received from a user by text input module 106 of mobile electronic device 102. A user may provide text 122 by interacting with one or more user interface elements of mobile electronic device 102 in any manner, including according to user interface elements/techniques described elsewhere herein or otherwise known. For instance, the user may provide text 122 by typing text 122 into a keyboard, by speaking text 122 (via voice recognition), through gesture recognition, and/or according to any other technique.

In step 204, the received text is displayed at a display component of the mobile electronic device. For instance, as shown in FIG. 1, text 122 provided by the user to text input module 106 may be transmitted to display component 104 as received text 124 for display as displayed text 114. In one embodiment, as each character is input by the user to text 122, the character may be provided for display in display component 104.

In step 206, an auto-correct dictionary is automatically selected from a plurality of auto-correct dictionaries based at least on usage information representative of a usage context of the mobile electronic device by the user. For example, as shown in FIG. 1, received text 124 may be received from text input module 106 by auto-correct module 108. Auto-correct module 108 may be configured to automatically select one of the auto-correct dictionaries in storage 110 based on a usage context of mobile electronic device 102. For instance, one or more of an identity of a user of mobile electronic device 102, a location of a user of mobile electronic device 102, and/or a current time may be used to automatically select an auto-correct dictionary. As shown in FIG. 1, auto-correct module 108 receives selected auto-correct dictionary 128 from storage 110. By automatically selecting the auto-correct dictionary for the user, the user does not need to manually select an auto-correct dictionary, and an appropriate auto-correct dictionary may be used at all times. Note that in some embodiments, step 206 may occur before step 202 and/or step 204.

Example embodiments for automatically selecting an auto-correct dictionary based on usage information are described further below.

In step 208, the displayed text is automatically corrected according to the selected auto-correct dictionary. As shown in FIG. 1, auto-correct module 108 may automatically correct received text 124 according to selected auto-correct dictionary 128. Auto-correct module 108 may replace terms (e.g., characters, words, phrases, symbols, etc.) in received text 124 with corrected terms to generate corrected text 126. Corrected text 126 may be provided to display component 104 for display as displayed text 114.

Auto-correct dictionaries, such as first auto-correct dictionary 116 and second auto-correct dictionary 118, may be configured in any manner to enable autocorrection. For instance, in embodiment, an auto-correct dictionary may include a preconfigured list of terms (e.g., characters, words, phrases, and/or symbols) to be automatically corrected when they are input by a user as text 122. Furthermore, the auto-correct dictionary may include a corresponding list of correction terms used as the automatic replacement text for the terms to be automatically corrected. For instance, a portion of an example English auto-correct dictionary is shown as follows:

| | |
|---|---|
| yo | you |
| yuor | your |
| changeit | change it |
| (r) | ® |
| where"s | where's |
| ... | ... |

The first column of the above example auto-correct dictionary is the preconfigured list of terms that are to be automatically corrected. The second column of the above example is the list of correction terms corresponding to the terms in the first column. The correction terms in the second column are used as the replacement text for the corresponding terms in the first column.

For instance, the term "yuor" may be received by auto-correct module 108 in received text 124. Auto-correct module 108 may be using the above example auto-correct dictionary, may detect the received term "yuor" in the first column of the above example auto-correct dictionary, and as a result may replace the received term "yuor" with the corresponding correction term of "your" in the second column. This correction may be included in corrected text 126 output by auto-correct module 108.

In other embodiments, auto-correct module 108 may use other techniques/algorithms to automatically correct received text 124 to generate corrected text 126.

In embodiments, step 206 of flowchart 200 may be performed in various ways, and auto-correct module 108 may be configured in various ways to select an auto-correct dictionary based on usage context. Examples embodiments for step 206 and auto-correct module 108 are described in the following subsections. It is noted that the embodiments described herein may be combined in any form, and an auto-correct dictionary may be selected to perform autocorrection based on any one or on any combination of usage contexts (user identity, location, time, etc.).

A. Automatically Correcting Text Based on User Identity

In an embodiment, autocorrection of text provided by a user may be performed based at least on an identity of the user that provided the text. In this manner, autocorrection is more likely to be performed for the user in a language understandable to the user.

Figures 3, 4:
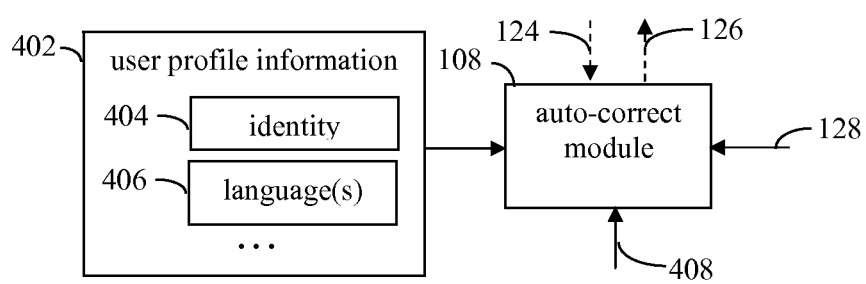
FIG. 3 shows a process for selecting an auto-correct dictionary for autocorrecting text based on an identity of a user, according to an example embodiment.
FIG. 4 shows a block diagram of an auto-correct module that autocorrects text based on user profile information, according to an example embodiment.

For instance, in an embodiment, step 206 of flowchart 200 may operate according to FIG. 3. FIG. 3 shows a step 302 for selecting an auto-correct dictionary for autocorrecting text based on an identity of a user, according to an example embodiment. In step 302, an auto-correct dictionary is automatically selected from a plurality of auto-correct dictionaries based at least on an identity of the user. In an embodiment, auto-correct module 108 of FIG. 1 may operate according to step 302, and usage information 120 may include identity information associated with the user.

An identity of the user of mobile electronic device 102 may be determined in various ways. For instance, information associated with an identity of a user may be accessed, such as by accessing a user profile associated with an account of the user, including an operating system login account of the user, a text message account of the user, an email account of the user, a social network account of the user, another account of the user, and/or in another manner.

For example, FIG. 4 shows a block diagram of auto-correct module 108 configured to autocorrect text based on user profile information, according to an example embodiment. As shown in FIG. 4, auto-correct module 108 receives user profile information 402. User profile information 402 may include various types of identity information for the user, including an identity 404, language(s) 406, and/or further information. Identity 404 indicates an identity of the user. Identity 404 may indicate the user identity in various ways, such as by name, by login identifier, by an identification number, and/or in other way. Language(s) 406 indicates one or more languages understandable to the user. For instance, language(s) 406 may indicate one or more different languages, dialects of a same language, subsets of a same language, and/or other language forms that are understandable to the user. Each language may be identified by name, by a corresponding language identifier (e.g., an identification number), or in other ways.

In an embodiment, when a user of mobile electronic device 102 of FIG. 1 provides text 122, auto-correct module 108 may automatically select an auto-correct dictionary from the plurality of auto-correct dictionaries in storage 110 for a language spoken by the user, as identified in user profile information 402 of FIG. 4.

For instance, as shown in FIG. 4, auto-correct module 108 may receive received text 124 and a user indication 408. User indication 408 indicates the particular user that input received text 124. For instance, user indication 408 may indicate the particular user by a login identifier for the user (when logged in), or in another manner. Auto-correct module 108 may compare the login identifier or other identifier for the user to identity 404 of user profile information 402 to determine whether user profile information 402 is the user's user profile information 402. It is noted that a plurality of user profiles may be maintained for a plurality of users, each having a corresponding user profile information 402. When user profile information 402 corresponding to the identifier for the user is determined, auto-correct module 108 may access language(s) 406 in the determined user profile information 402 to determine one or more languages understandable to the user. Auto-correct module 108 may then select an auto-correct dictionary from storage 110 (FIG. 1) corresponding to a language understandable to the user.

In one situation, language(s) 406 may indicate a single language understandable to the user (e.g., by a language identifier). In such case, auto-correct module 108 may locate and select an auto-correct dictionary in storage 110 for that particular language (e.g., an auto-correct dictionary that has a matching language identifier). In another example, language(s) 406 may indicate multiple languages understandable to the user (e.g., each identified by a corresponding language identifier). In such case, auto-correct module 108 may select one of the languages, such as by selecting one of the languages randomly, selecting a language indicated as highest priority (e.g., best understood by the user), based on other usage information, and/or selecting the language in another manner. Auto-correct module 108 may then locate and select an auto-correct dictionary in storage 110 for that selected language (e.g., an auto-correct dictionary that has a matching language identifier).

As shown in FIG. 4, auto-correct module 108 may receive the selected auto-correct dictionary as selected auto-correct dictionary 128, may auto-correct received text 124 according to selected auto-correct dictionary 128 (e.g., according to step 208 of flowchart 200), and may generate corrected text 126 to include the autocorrected text. As shown in FIG. 1, corrected text 126 may be displayed to the user by display component 104 as displayed text 114.

B. Automatically Correcting Text Based on Location

In an embodiment, autocorrection of text provided by a user may be performed based at least on the location of the mobile device receiving the text from the user, at the time the text is received. In this manner, autocorrection is more likely to be performed for the user in a language understandable to the user.

For instance, if the user is using the mobile device in the United States, there is a reasonable likelihood that the user understands and desires to communicate in English. As such, the autocorrection functionality of the mobile device may be set to English. If, at another time, the user is using the mobile device in Italy, there is a reasonable likelihood that the user understands and desires to communicate in Italian. As such, the autocorrection functionality of the mobile device may be changed to Italian. The automatic changing of the autocorrection language in this manner may save the user from having to manually change the language whenever the user changes localities.

Such a location selection may be set to any granularity level of location region, including by country, province, state, county, city, municipality, neighborhood, a customized region (e.g., configured by the user interacting with a user interface element to draw a boundary around a region), or any other location region.

For instance, in an embodiment, step 206 of flowchart 200 may operate according to FIG. 5. FIG. 5 shows a step 502 for selecting an auto-correct dictionary for autocorrecting text based on a location of a mobile device, according to an example embodiment. In step 502, an auto-correct dictionary may be automatically selected from a plurality of auto-correct dictionaries based at least on a location of the mobile device. In an embodiment, auto-correct module 108 of FIG. 1 may operate according to step 502, and usage information 120 may include location information associated with the mobile device.

A location of mobile electronic device 102 may be determined in various ways. For instance, a location of mobile electronic device 102 may be determined according to GPS (global positioning system) techniques, by multilateration of radio signals between multiple cell towers, and/or according to other techniques known to persons skilled in the relevant art(s).

For example, FIG. 6 shows a block diagram of a system 600 that autocorrects text based on location, according to an example embodiment. As shown in FIG. 6, system 600 includes a location determiner 602 and auto-correct module 108. System 600 may be implemented partially or entirely in a mobile device, such as mobile electronic device 102 of FIG. 1. Location determiner 602 is configured to determine a location of the mobile device, and to output an indication of the location as determined location 606. As shown in FIG. 6, auto-correct module 108 receives determined location 606, and selects an auto-correct dictionary based at least on determined location 606. Auto-correct module 108 automatically corrects received text 124 according to the selected auto-correct dictionary to generate corrected text 126.

In an embodiment, step 206 may be performed according to FIG. 7. FIG. 7 shows a flowchart 700 providing a process for selecting an auto-correct dictionary for autocorrecting text based on location, according to an example embodiment. In an embodiment, system 600 of FIG. 6 may operate according to flowchart 700. Flowchart 700 is described as follows with reference to system 600. Further structural and operational embodiments will be apparent to persons skilled in the relevant art(s) based on the following description.

Flowchart 700 begins with step 702. In step 702, the location of the mobile electronic device is determined by a location determiner of the mobile electronic device. As described above, a user of mobile electronic device 102 of FIG. 1 may provide text 122. In an embodiment, location determiner 602 is configured to determine a location of mobile electronic device 102 when text 122 is received, and to output an indication of the location as determined location 606. Location determiner 602 may be configured to determine a location of a mobile device in any manner, such as according to GPS techniques, by multilateration of radio signals from cell towers, and/or according to other techniques mentioned elsewhere herein or otherwise known. For instance, in an embodiment, location determiner 602 may include a GPS receiver that receives signals from GPS satellites, and uses GPS techniques to determine a location based on a timing of the received signals.

In step 704, the determined location is compared to a plurality of geographic regions associated with the plurality of auto-correct dictionaries. As shown in FIG. 6, auto-correct module 108 receives determined location 606. Determined location 606 indicates the determined location of the mobile device. For instance, determined location 606 may include coordinates of the location (e.g., latitude and longitude), or location determiner 602 may determine an identifier for the determined location (e.g., a country, state, county, city, neighborhood, a customized region, etc.), and may include the identifier in determined location 606.

In an embodiment, each auto-correct dictionary stored in storage 110 (FIG. 1) has corresponding location information that identifies which location region(s) the auto-correct dictionary is to be used for. For instance, first auto-correct dictionary 116 may be an English language auto-correct dictionary, and may have location information that indicates the United States, England, and Australia as applicable location regions. Second auto-correct dictionary 118 may be an Italian language auto-correct dictionary, and may have location information that indicates Italy, Switzerland, San Marino, Vatican City, Slovenian Istria, and Istria County in Croatia as applicable location regions.

Auto-correct module 108 includes a comparator 604. Comparator 604 is configured to compare determined location 606 to the location region information corresponding to each auto-correct dictionary in storage 110 to determine which auto-correct dictionary to use to perform auto-correction. For instance, as shown in FIG. 6, comparator 604 may receive location information 608 from each auto-correct dictionary. Comparator 604 may compare determined location 606 to location information 608 to determine which auto-correct dictionary(s) are applicable to determined location 606. For instance, comparator 604 may determine that location coordinates received in determined location 606 indicate a location within the United States, which is a location region indicated for first auto-correct dictionary 116. As a result, comparator 604 may provide a compare result that indicates first auto-correct dictionary 116.

Referring back to FIG. 7, in step 706, the auto-correct dictionary is selected from the plurality of auto-correct dictionaries based at least on the comparison. In an embodiment, auto-correct module 108 may select from storage 110 the auto-correct dictionary indicated by comparator 604 as being applicable to determined location 606. In the event that multiple auto-correct dictionaries are indicated by comparator 604 to be associated with determined location 606, auto-correct module 108 may select one of the multiple auto-correct dictionaries in any manner, such as by selecting one randomly, selecting one indicated as the highest priority relative to the other associated auto-correct dictionaries, selecting one based on other usage information, or selecting one in another manner.

As shown in FIG. 6, auto-correct module 108 may receive the selected auto-correct dictionary as selected auto-correct dictionary 128, may auto-correct received text 124 according to selected auto-correct dictionary 128, and may generate corrected text 126. Corrected text 126 may be displayed to the user by display component 104 as displayed text 114, as shown in FIG. 1.

C. Automatically Correcting Text Based on Time Information

In an embodiment, autocorrection of text provided by a user may be performed based at least on time information indicating a time and/or date at/on which the mobile device receives the text from the user. In this manner, autocorrection is more likely to be performed for the user in a language understandable to the user.

For instance, a user may be a native of Italy that is working in the United States. If the user is using the mobile device during work hours, there is a reasonable likelihood that the user desires to communicate in English in the user's workplace (if English is the primary language used in the user's workplace). As such, the autocorrection functionality of the mobile device may be automatically set to English during work hours. If at other times of the day, and/or the weekends, the user is using the mobile device in a more casual setting (e.g., to communicate with friends and/or family), there is a reasonable likelihood that the user may desire to communicate in the user's native language of Italian. As such, the autocorrection functionality of the mobile device may be automatically changed to Italian during non-work hours (e.g., mornings, evenings, and weekends). The automatic changing of the autocorrection language in this manner may save the user from having to manually change the language multiple times per day.

It is noted that autocorrect functionality may be set and changed for any granularity level of time period, including minutes, hours, days, weeks, months, portions of weeks (e.g., particular weekdays/weekend), portions of days (e.g., morning, afternoon, evening, etc.), or any other time period. The user may be enabled to set a schedule of times/dates at which particular auto-correct dictionaries are used. Alternatively, auto-correct module 108 may use machine learning and/or other techniques (e.g., based on a history of the user's activities) to automatically predict which language the user may prefer to use for autocorrection at particular times/dates, and thereby to automatically select the auto-correct dictionaries the user may use at particular times/dates.

Figure 8:
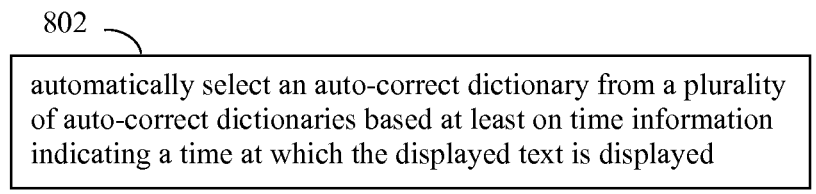
FIG. 8 shows a process for selecting an auto-correct dictionary for autocorrecting text based on time information, according to an example embodiment.

For instance, in an embodiment, step 206 of flowchart 200 may operate according to FIG. 8. FIG. 8 shows a step 802 for selecting an auto-correct dictionary for autocorrecting text based on time information, according to an example embodiment. In step 802, an auto-correct dictionary is automatically selected from a plurality of auto-correct dictionaries based at least on time information indicating a time at which the displayed text is displayed. In an embodiment, auto-correct module 108 of FIG. 1 may operate according to step 802, and usage information 120 may include time information associated with the mobile device.

A current time may be determined in various ways. For instance, mobile electronic device 102 may include a clock that indicates time/date, may include a calendar tool associated with a user that indicates time/date, and/or may determine time according to another mechanism known to persons skilled in the relevant art(s).

Figure 9:
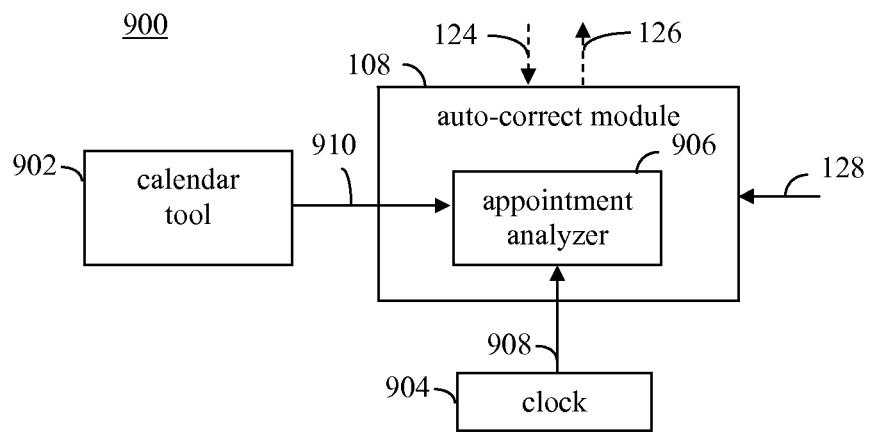
FIG. 9 shows a block diagram of a system that autocorrects text based on time information, according to an example embodiment.

FIG. 9 shows a block diagram of a system 900 that autocorrects text based on time information, according to an example embodiment. As shown in FIG. 9, system 900 includes a calendar tool 902 a clock 904, and an auto-correct module 108. System 900 may be implemented partially or entirely in a mobile device, such as mobile electronic device 102 of FIG. 1. Calendar tool 902 is a calendar tool executing on a mobile device, such as Microsoft® Outlook® or other calendar tool/application, that enables a user to schedule appointments (e.g., meetings, tasks, etc.) at various times. Clock 904 is a clock mechanism (e.g., a computer program, etc.) of the mobile device that indicates a current time 908 (e.g., a time at or after which text to be autocorrected is received). Examples of clock 904 are well known to persons skilled in the relevant art(s).

In an embodiment, auto-correct module 108 may access calendar tool 902 to determine one or more appointments of the user, and to thereby change autocorrect dictionaries based on the contents of the appointments. As shown in FIG. 6, auto-correct module 108 may receive current time 908 from clock 904, and may access calendar tool 902 to determine if the user has an appointment at the time indicated by current time 908. Auto-correct module 108 may extract appointment information 910 from the appointment. Appointment information 910 may include various information, such as indicating a location at which a meeting is occurring (which may be used to select an auto-correct dictionary as described above), indicating a language in which a meeting is being conducted, or other appointment related information. Auto-correct module 108 may select an auto-correct dictionary based at least on appointment information 910 received from calendar tool 902 for the current time. Auto-correct module 108 automatically corrects received text 124 according to the selected autocorrect dictionary to generate corrected text 126.

Figure 10:
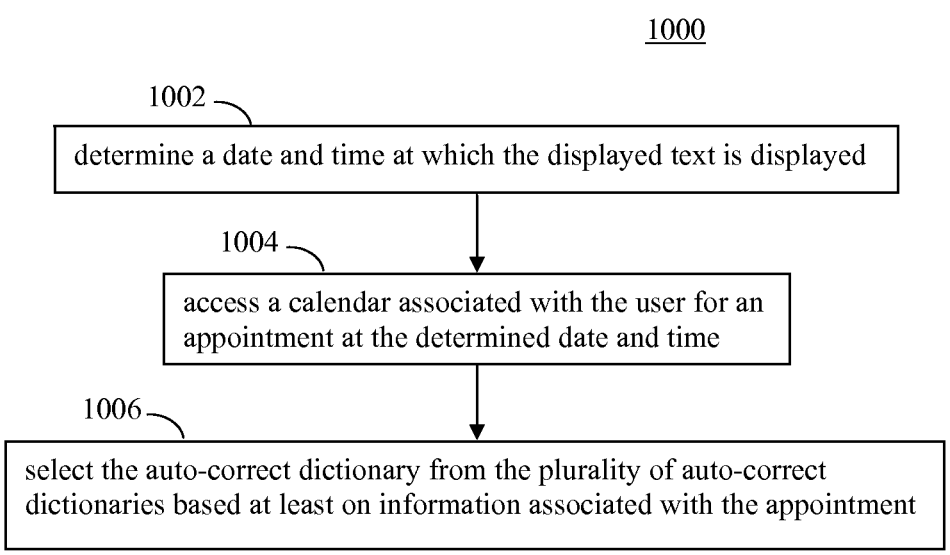
FIG. 10 shows a flowchart providing a process for selecting an auto-correct dictionary for autocorrecting text based on time, according to an example embodiment.

In an embodiment, step 206 may be performed according to FIG. 10. FIG. 10 shows a flowchart 1000 providing a process for selecting an auto-correct dictionary for autocorrecting text based on time, according to an example embodiment. In an embodiment, system 900 of FIG. 9 may operate according to flowchart 1000. Flowchart 1000 is described as follows with reference to system 900. Further structural and operational embodiments will be apparent to persons skilled in the relevant art(s) based on the following description.

Flowchart 1000 begins with step 1002. In step 1002, a date and time at which the displayed text is displayed is determined. As described above, a user of mobile electronic device 102 of FIG. 1 may provide text 122. In an embodiment, clock 904 is configured to indicate a current time. Current time 908 may be accessed by auto-correct module 108 when text 122 is received to determine a time and/or date at which received text 124 is received.

In step 1004, a calendar associated with the user is accessed for an appointment at the determined date and time. As shown in FIG. 9, auto-correct module 108 includes an appointment analyzer 906. Appointment analyzer 906 is configured to analyze an appointment received from calendar tool 902 for information that may be used to select an auto-correct dictionary. For instance, as shown in FIG. 9, appointment analyzer 906 receives current time 908. Appointment analyzer 906 may access an appointment scheduled in calendar tool 902 occurring at current time 908 to retrieve appointment information 910. Appointment information 910 may include the contents of the appointment occurring at current time 908, indicating one or more of the appointment attendees, a location of the appointment/meeting, etc. Appointment analyzer 906 may analyze appointment information 910 to determine a location of the user (e.g., at a location of the meeting).

Referring back to FIG. 10, in step 1006, the auto-correct dictionary is selected from the plurality of auto-correct dictionaries based at least on information associated with the appointment. In an embodiment, auto-correct module 108 may select from storage 110 the auto-correct dictionary indicated by appointment analyzer 906 for a language that is applicable to the location determined by analyzing appointment information 910. In the event that multiple auto-correct dictionaries are indicated by appointment analyzer 906 to be associated with the determined location, auto-correct module 108 may select one of the multiple auto-correct dictionaries in any manner, such as by selecting one randomly, selecting one indicated as the highest priority relative to the other associated auto-correct dictionaries, selecting one based on other usage information, or selecting one in another manner.

As shown in FIG. 9, auto-correct module 108 may receive the selected auto-correct dictionary as selected auto-correct dictionary 128, may auto-correct received text 124 according to selected auto-correct dictionary 128, and may generate corrected text 126. Corrected text 126 may be displayed to the user by display component 104 as displayed text 114, as shown in FIG. 1.

D. Further Embodiments for Automatically Correcting Text

As mentioned above, any of the usage information described herein may be used in combination to select an auto-correct dictionary. Furthermore, although auto-correct dictionaries are shown in FIG. 1 as being stored in mobile electronic device 102 (in storage 110), in an embodiment, a selected auto-correct dictionary may be retrieved by mobile electronic device 102 from a remote device (e.g., a server, such as a "cloud"-based server) over a network (e.g., a local area network (LAN), or a wide area network (WAN) such as the Internet). Furthermore, although usage information 120 is described above as being determined in mobile electronic device 102, in an embodiment, usage information 120 may be determined remotely from mobile electronic device 102, and transmitted thereto. For instance, a remote device, such as a server (e.g., a "cloud"-based server) may be used to determine an identity of the user (e.g., by accessing a remotely maintained user account, etc.), to determine a location of the user (e.g., by location information input by the user to a social network), to determine time information (e.g., by accessing a remotely stored calendar, etc.) and/or to determine further types of usage information.

III. Example Computing Device Embodiments

Text input module 106, auto-correct module 108, location determiner 602, comparator 604, calendar tool 902, clock 904, appointment analyzer 906, flowchart 200, step 302, step 502, flowchart 700, step 802, and flowchart 1000 may be implemented in hardware, or hardware and any combination of software and/or firmware. For example, text input module 106, auto-correct module 108, location determiner 602, comparator 604, calendar tool 902, clock 904, appointment analyzer 906, flowchart 200, step 302, step 502, flowchart 700, step 802, and/or flowchart 1000 may be implemented as computer program code configured to be executed in one or more processors and stored in a computer readable storage medium. Alternatively, text input module 106, auto-correct module 108, location determiner 602, comparator 604, calendar tool 902, clock 904, appointment analyzer 906, flowchart 200, step 302, step 502, flowchart 700, step 802, and/or flowchart 1000 may be implemented as hardware logic/electrical circuitry.

For instance, in an embodiment, one or more of text input module 106, auto-correct module 108, location determiner 602, comparator 604, calendar tool 902, clock 904, appointment analyzer 906, flowchart 200, step 302, step 502, flowchart 700, step 802, and/or flowchart 1000 may be implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
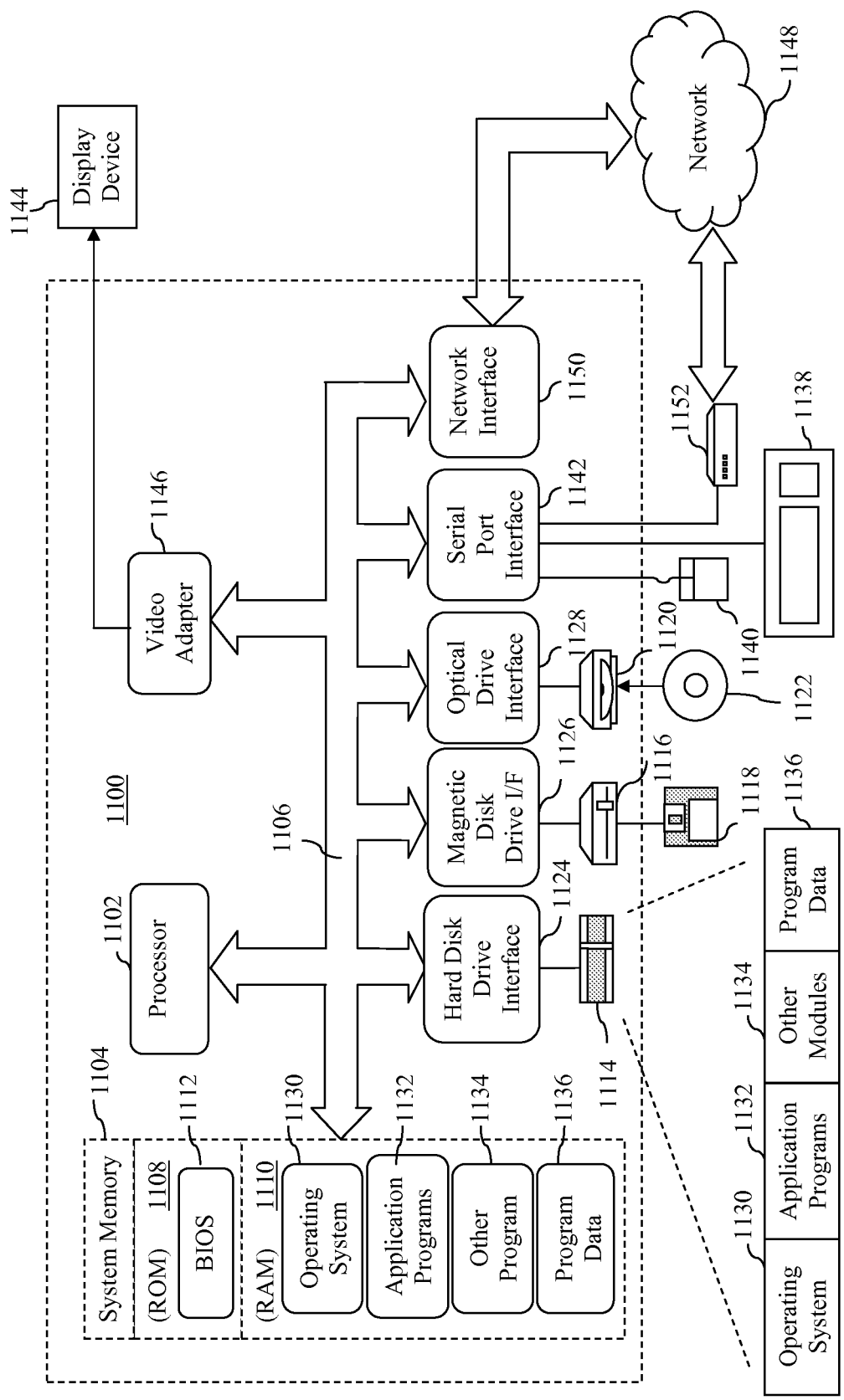
FIG. 11 shows a block diagram of an example computer that may be used to implement embodiments of the present invention.

FIG. 11 depicts an exemplary implementation of a computer 1100 in which embodiments of the present invention may be implemented. For example, mobile electronic device 102 may be implemented in one or more computer systems similar to computer 1100, including one or more features of computer 1100 and/or alternative features. The description of computer 1100 provided herein is provided for purposes of illustration, and is not intended to be limiting. Embodiments of the present invention may be implemented in further types of computer systems, as would be known to persons skilled in the relevant art(s).

As shown in FIG. 11, computer 1100 includes one or more processors 1102, a system memory 1104, and a bus 1106 that couples various system components including system memory 1104 to processor 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, computer program logic (e.g., computer program code or instructions) for implementing text input module 106, auto-correct module 108, location determiner 602, comparator 604, calendar tool 902, clock 904, appointment analyzer 906, flowchart 200, step 302, step 502, flowchart 700, step 802, and/or flowchart 1000 (including any step of flowcharts 200, 700, and 1000), and/or further embodiments described herein.

A user may enter commands and information into the computer 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor 1102 through a serial port interface 1142 that is coupled to bus 1106, but may be connected by other interfaces, such as a parallel port, game port, or a universal serial bus (USB).

A display component 1144 is also connected to bus 1106 via an interface, such as a video adapter 1146. In addition to the monitor, computer 1100 may include other peripheral output devices (not shown) such as speakers and printers.

Computer 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to generally refer to media such as the hard disk associated with hard disk drive 1114, removable magnetic disk 1118, removable optical disk 1122, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150, serial port interface 1142, or any other interface type. Such computer programs, when executed or loaded by an application, enable computer 1100 to implement features of embodiments of the present invention discussed herein. Accordingly, such computer programs represent controllers of the computer 1100.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. An electronic device, comprising:
a display component capable of at least displaying textual characters;
a text input module that receives text provided by a user to the electronic device, and provides the received text to the display component for display in a user interface; and
an auto-correct module configured to:
determine that the received text switches from a first language to a second language based on usage information;
based on determining that the usage information is representative of a first usage context of the electronic device, automatically switch from a previously-selected first auto-correct dictionary corresponding to the first language to a second auto-correct dictionary corresponding to the second language selected from a plurality of auto-correct dictionaries, and automatically correct the displayed text according to the second auto-correct dictionary, the second language being different from the first language; and
based on determining that the usage information is representative of a second usage context of the electronic device, automatically switch off one or more particular auto-correct terms from the previously-selected first auto-correct dictionary, and automatically correct the displayed text according to the previously-selected first auto-correct dictionary having the one or more particular auto-correct terms switched off.

2. The electronic device of claim 1, wherein the usage information indicates an identity of the user.

3. The electronic device of claim 1, wherein the usage information indicates a location of the electronic device.

4. The electronic device of claim 1, wherein the usage information includes time information that indicates a time at which the displayed text is displayed.

5. The electronic device of claim 1, wherein the plurality of auto-correct dictionaries includes a third auto-correct dictionary corresponding to the first language that is different from the first auto-correct dictionary.

6. The electronic device of claim 4, wherein the usage information further includes date information that indicates a date at which the displayed text is displayed.

7. A method in an electronic device, comprising:
receiving, by an input device of the electronic device, text provided by a user to the electronic device;
displaying the received text at a display component of the electronic device;
performing, in response to determining that the received text switches from a first language to a second language based on usage information:
based on determining that the usage information is representative of a first usage context of the electronic device, automatically switching, by a processor, from a previously-selected first auto-correct dictionary corresponding to the first language to a second auto-correct dictionary corresponding to the second language selected from a plurality of auto-correct dictionaries and automatically correcting the displayed text according to the second auto-correct dictionary; and
based on determining that the usage information is representative of a second usage context of the electronic device, automatically switching off one or more particular auto-correct terms from the previously-selected first auto-correct dictionary, and automatically correcting the displayed text according to the previously-selected first auto-correct dictionary having the one or more particular auto-correct terms switched off.

8. The method of claim 7, wherein said automatically switching from a previously-selected first auto-correct dictionary comprises:
automatically switching to the second auto-correct dictionary based at least on an identity of the user.

9. The method of claim 7, wherein the second auto-correct dictionary corresponds to an auto-correction dictionary for a language spoken by the user.

10. The method of claim 7, wherein said automatically switching from a previously-selected first auto-correct dictionary comprises:
automatically switching to the second auto-correct dictionary based at least on a location of the electronic device.

11. The method of claim 10, wherein said automatically switching to the second auto-correct dictionary based at least on a location of the electronic device comprises:
determining the location of the electronic device in a location determiner of the electronic device;
comparing the determined location to a plurality of geographic regions associated with the plurality of auto-correct dictionaries; and
switching to the second auto-correct dictionary based at least on said comparing.

12. The method of claim 7, wherein said automatically switching from a previously-selected first auto-correct dictionary comprises:
automatically switching to the second auto-correct dictionary based at least on time information indicating a time at which the displayed text is displayed.

13. The method of claim 12, wherein said automatically switching to the second auto-correct dictionary based at least on time information indicating a time at which the displayed text is displayed comprises:

determining a date and time at which the displayed text is displayed;

accessing a calendar associated with the user for an appointment at the determined date and time; and switching to the second auto-correct dictionary based at least on information associated with the appointment.

14. A computer readable storage medium having computer program instructions embodied in said computer readable storage medium for enabling a processor to generate a user interface at a computing device, the computer program instructions comprising:

first computer program instructions that enable the processor to receive text provided by a user to the electronic device;

second computer program instructions that enable the processor to display the received text at a display component of the electronic device; and third computer program instructions that enable the processor to:

in response to determining that the received text switches from a first language to a second language based on usage information:

based on determining that the usage information is representative of a first usage context of the electronic device, automatically switch from a previously-selected first auto-correct dictionary corresponding to the first language to a second auto-correct dictionary corresponding to the second language selected from a plurality of auto-correct dictionaries, the second auto-correct dictionary including a predetermined list of terms for correction and a corresponding list of correction terms, the usage information including at least location information, and automatically correct the displayed text according to the second auto-correct dictionary, the second language being different from the first language; and based on determining that the usage information is representative of a second usage context of the electronic device, automatically switch off one or more particular auto-correct terms from the previously-selected first auto-correct dictionary, and automatically correct the displayed text according to the previously-selected first auto-correct dictionary having the one or more particular auto-correct terms switched off.

15. The computer readable storage medium of claim 14, wherein said third computer program instructions comprise:

fourth computer program instructions that enable the processor to automatically switch to the second auto-correct dictionary based at least on an identity of the user.

16. The computer readable storage medium of claim 14, wherein the second auto-correct dictionary corresponds to an auto-correction dictionary for a language spoken by the user.

17. The computer readable storage medium of claim 14, wherein said third computer program instructions comprise:

fourth computer program instructions that enable the processor to automatically switch to the second auto-correct dictionary based at least on a location of the electronic device.

18. The computer readable storage medium of claim 17, wherein said fourth computer program instructions comprise:

computer program instructions that enable the processor to determine the location of the electronic device in a location determiner of the electronic device;

computer program instructions that enable the processor to compare the determined location to a plurality of geographic regions associated with the plurality of auto-correct dictionaries; and computer program instructions that enable the processor to switch to the second auto-correct dictionary based at least on said comparing.

19. The computer readable storage medium of claim 14, wherein said third computer program instructions comprise:

fourth computer program instructions that enable the processor to automatically switch to the second auto-correct dictionary based at least on time information indicating a time at which the displayed text is displayed.

20. The computer readable storage medium of claim 19, wherein said fourth computer program instructions comprise:

computer program instructions that enable the processor to determine a date and time at which the displayed text is displayed;

computer program instructions that enable the processor to access a calendar associated with the user for an appointment at the determined date and time; and computer program instructions that enable the processor to switch to the second auto-correct dictionary based at least on information associated with the appointment.

* * * * *